United States Patent [19]

Dezse et al.

[11] Patent Number: 5,395,181
[45] Date of Patent: Mar. 7, 1995

[54] METHOD AND APPARATUS FOR PRINTING A CIRCULAR OR BULLSEYE BAR CODE WITH A THERMAL PRINTER

[75] Inventors: David M. Dezse, Powell; Gary W. Harris, Delaware; James J. Wolf, Columbus, all of Ohio

[73] Assignee: Microcom Corporation, Westerville, Ohio

[21] Appl. No.: 58,759

[22] Filed: May 10, 1993

[51] Int. Cl.6 ............................ B41J 2/00; B41J 5/00
[52] U.S. Cl. ................... 400/103; 235/432; 235/464
[58] Field of Search .......... 235/464, 432; 400/103, 400/127, 120

[56] References Cited

U.S. PATENT DOCUMENTS

| | | | |
|---|---|---|---|
| 3,418,456 | 12/1968 | Hamisch et al. | 235/464 |
| 3,643,068 | 2/1972 | Mohan et al. | 235/464 |
| 3,671,718 | 6/1972 | Genzel et al. | 235/464 |
| 3,735,096 | 5/1973 | Knockeart et al. | 235/464 |
| 3,744,026 | 7/1973 | Wolff | 235/464 |
| 3,757,090 | 9/1973 | Haefeli et al. | 235/464 |
| 3,770,944 | 11/1973 | Schanne et al. | 235/464 |
| 3,864,548 | 2/1974 | O'Neil, Jr. et al. | 235/464 |
| 4,292,511 | 9/1981 | Heyman et al. | 235/464 |
| 4,641,347 | 2/1987 | Clark et al. | 400/104 |
| 4,706,095 | 11/1987 | Ono et al. | 400/73 |
| 4,736,109 | 4/1988 | Dvorzsak | 235/464 |
| 4,744,680 | 5/1988 | Hirosaki et al. | 400/120 |
| 4,757,329 | 7/1988 | Sato et al. | 346/76 PH |
| 4,864,302 | 9/1989 | Bowers | 341/13 |
| 4,988,186 | 1/1991 | Hill et al. | 351/239 |
| 5,047,615 | 9/1991 | Fukumoto et al. | 235/432 |
| 5,056,429 | 10/1991 | Hirosaki | 400/103 |
| 5,061,946 | 10/1991 | Helmbold et al. | 400/578 |
| 5,082,516 | 1/1992 | Akao | 156/277 |
| 5,085,533 | 2/1992 | Kitahara et al. | 400/652 |
| 5,183,343 | 2/1993 | Tazawa et al. | 400/103 |

*Primary Examiner*—Edgar S. Burr
*Assistant Examiner*—Steven S. Kelley
*Attorney, Agent, or Firm*—Ronald P. Kananen

[57] ABSTRACT

A method and apparatus for converting bar code information into a circular barcode from a linear format using a graphics generator are disclosed. Data representative of a user selected barcode are retrieved from storage along with stored character generator data defining a plurality of bars and spaces representative of the user-selected barcode. The retrieved barcode is transformed into a circular barcode for commanding a printer to cause a print of said circular barcode to be made.

8 Claims, 3 Drawing Sheets

CIRCULAR BARCODE

CIRCULAR BARCODE

RECTANGULAR BARCODE

METHOD AND APPARATUS FOR PRINTING A CIRCULAR OR BULLSEYE BAR CODE WITH A THERMAL PRINTER

BACKGROUND OF THE INVENTION

This invention relates to a method and apparatus for printing a circular bar code. More particularly, this invention relates to a method and apparatus for printing a circular or bullseye bar code with a thermal printer. Still more particularly, this invention relates to a routine for converting a linear bar code to a circular bar code for printing, especially with a thermal printer.

DESCRIPTION OF THE PRIOR ART

The use of machine-readable or scanned bar codes in optical recognition systems is well known. Such bar codes are either linear, as are positioned on grocery items for example, for laser scanning at checkout, or circular. Such circular bar codes are sometimes referred to as bullseye bar codes and were developed by 1949 by Bernard Silver and N.J. Woodland. As is well known, such bar codes are formed from a combination of spaced narrow lines and wide lines positioned about white spaces according to nationally accepted standards for such codes.

More specifically, for retail businesses, for example, goods or articles are labelled with a bar code, such as an EAN code (or UPC code) which identifies the article and its origin. The code is composed of a plurality of bars having a different width and spaces, which stand for or symbolize figures or digits. Those figures or digits are usually printed adjacent the bar code, preferably below the bar code. The bar code is optically read, either by passing the parcel or article over a fixed optical reader or by passing an optical reader over the code. Information concerning the article can thus be extracted from a memory based on the bar code.

U.S. Pat. No. 4,659,415 shows an example of a printer for a bar code label having a thermal printer head for printing on a heat-sensitive label. The printer head has a plurality of resistance dots arranged close to the rim of a substrate, which in turn is supported by a metal block. The resistance dots are provided with power pulses which depend on the information which is to be printed on the label. One or several temperature sensors are arranged in the metal block and control the pulse width of the power pulses in order to provide the resistance dots with the proper power supply at each instant.

U.S. Pat. No. 4,706,095 shows an example of a portable thermal printer in combination with a data memory for storing scanned bar code information. A print command issued by a control circuit releases the memory content for printing by a thermal print head on a label. Data may also be loaded into the memory from other external sources.

U.S. Pat. No. 5,056,429 is an example of a bar code printing method for leaving fixed margins on both sides of a printed bar code, with symbol guards printed along the height direction of the bar code pattern. There, it is explained that there are a plurality of standards for bar codes. In each standard, the number of characters per unit dimension, the size of a narrow bar, and the ratio between the sizes of a narrow bar and a wide bar are different. There are standard specifications and optional specifications in the kinds of bar codes.

Generally there are two methods for printing bar codes, according to the '429 patent. One is a thermosensible method in which thermosensible paper is used for a printing medium and the other is an ink transcription method in which ink is transcribed through a printing ribbon on a printing medium or ordinary paper. In an ink transcription method, a thermal transfer ink ribbon is used. Some printers are provided with stretching mechanism for ribbons not be slackened.

However, the prior art has not developed a suitable method for printing circular bar codes, or bullseye bar codes as they are usually referred to. Basically, a circular or radial bar code includes a plurality of sized narrow and side bars with predetermined spaces between them, like the linear bar code, but arranged in a circle. Such a circular or radial bar code can be bi-directionally scanned. However, the prior art is deficient in that methods and systems for printing circular bar codes are lacking.

A circular barcode has advantages when used in conjunction with scanning equipment and conveyor systems. The barcode allows the label to be positioned anywhere on a box or carton and the box or carton to be rotated at any angle on the conveyor system. However, such is now being accomplished by using conventional linear barcodes and multiple scanners which therefore represents an expensive solution.

Thus, it is an overall problem in this art to provide a method and apparatus for printing a radial or circular or bullseye bar code conveniently using microprocessor control for commanding a printer, such as a thermal printer.

BRIEF SUMMARY OF THE INVENTION

It is a general object of this invention to provide a method and apparatus for conveniently printing a circular or radial or bullseye bar code with a microprocessor-controlled printer, such as a thermal printer.

It is another general object of this invention to use a commercially available CPU and graphics program as a basis for generating a circular bar code with a print head, such as a thermal print head.

It is still another general object of this invention to utilize a standard barcode algorithm for generating a circular bar code corresponding to the linear barcode, which can be read using conventional scanning equipment.

In one aspect, this invention relates to a method of printing a circular bar code pattern with a printer, comprising the steps of retrieving stored data representative of a user-selected barcode; retrieving character generator data defining a plurality of bars and spaces representative of said user-selected barcode; transforming said barcode into a circular barcode; and causing a printer to print said circular barcode. The userselected barcode defines an origin, a radius, and a white space for said circular barcode. The step of retrieving character generator data is followed by a step of generating a black run in the character generator data to define Xvar, Yvar data for a circular barcode of width W, followed by a step of generating a white run in the character generator data for a radius $R = R + Dx$, where Dx is the width of the black circle generated in the black run step.

In another aspect, the invention relates to a circular bar code printing apparatus having a bar code storage means for storing a variety of linear bar code patterns, means for selecting at least one of the stored linear bar code patterns; character generator means for generating a character defining a plurality of bars and spaces for the selected barcode; means for referencing the character by a pointer defined by the encoded data format; means for framing a circle defining the selected barcode; means for generating the circular barcode; and means for printing the circular barcode. The bar code storage means can store either or both read barcodes or barcode algorithms representing the plurality of the stored linear bar code patterns.

The means for framing a circle includes means for determining a white space as a barcode quiet zone in the center of the barcode in units of thermal printhead dots Xor, Yor for a radius R, where Xor is a user supplied X coordinate at the center of the circle, and Yor is a user supplied Y coordinate at the center of the circle; Xvar for an adjusted X coordinate which defines the right side of the circuit; Yvar for an adjusted Y coordinate which defines the top of the circle; Dx is a horizontal and vertical separation between the outer and inner ellipses of the framed circle, and W is the width and/or height of the framed circle.

The means for generating the circular bar code includes means for retrieving the encoded barcode data; obtaining character generator data by a black run, followed by a framed circle routine, obtaining character generator data by a white run, and repeating the routine to generate a spaced plurality of circular black and white zones.

These and other features of the invention will become apparent from a written description of the invention which follows taken with the accompanying drawings.

DETAILED DESCRIPTION OF THE PREFERRED EMBODIMENTS

Figure 1A:
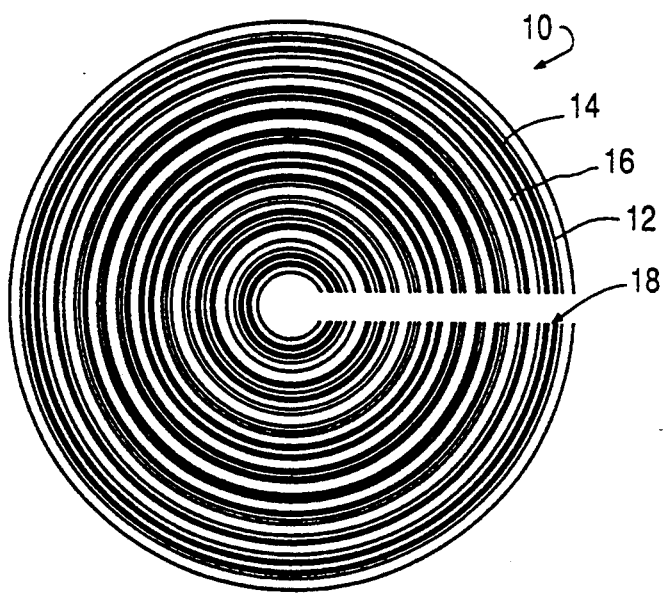
FIG. 1 is a diagrammatic illustration of the relationship between a circular barcode, as shown in FIG. 1A, and a rectangular or linear barcode, as shown in FIG. 1B.
Figure 1B:

FIG. 1A is a plan view of a circular barcode, shown generally by the reference numeral 10, which is generated according to the invention. The circular barcode 10 includes a plurality of lines 12, 14 of different widths and a plurality of spaces 16 of varying widths therebetween as is well known in the art. FIG. 1B shows a corresponding linear barcode illustrating the relationship of the plurality of lines 12, 14 and spaces 16 corresponding with those of the circular barcode of FIG. 1A. FIG. 1B is thus representatively extracted from the space 18 in FIG. 1A.

Figure 2:
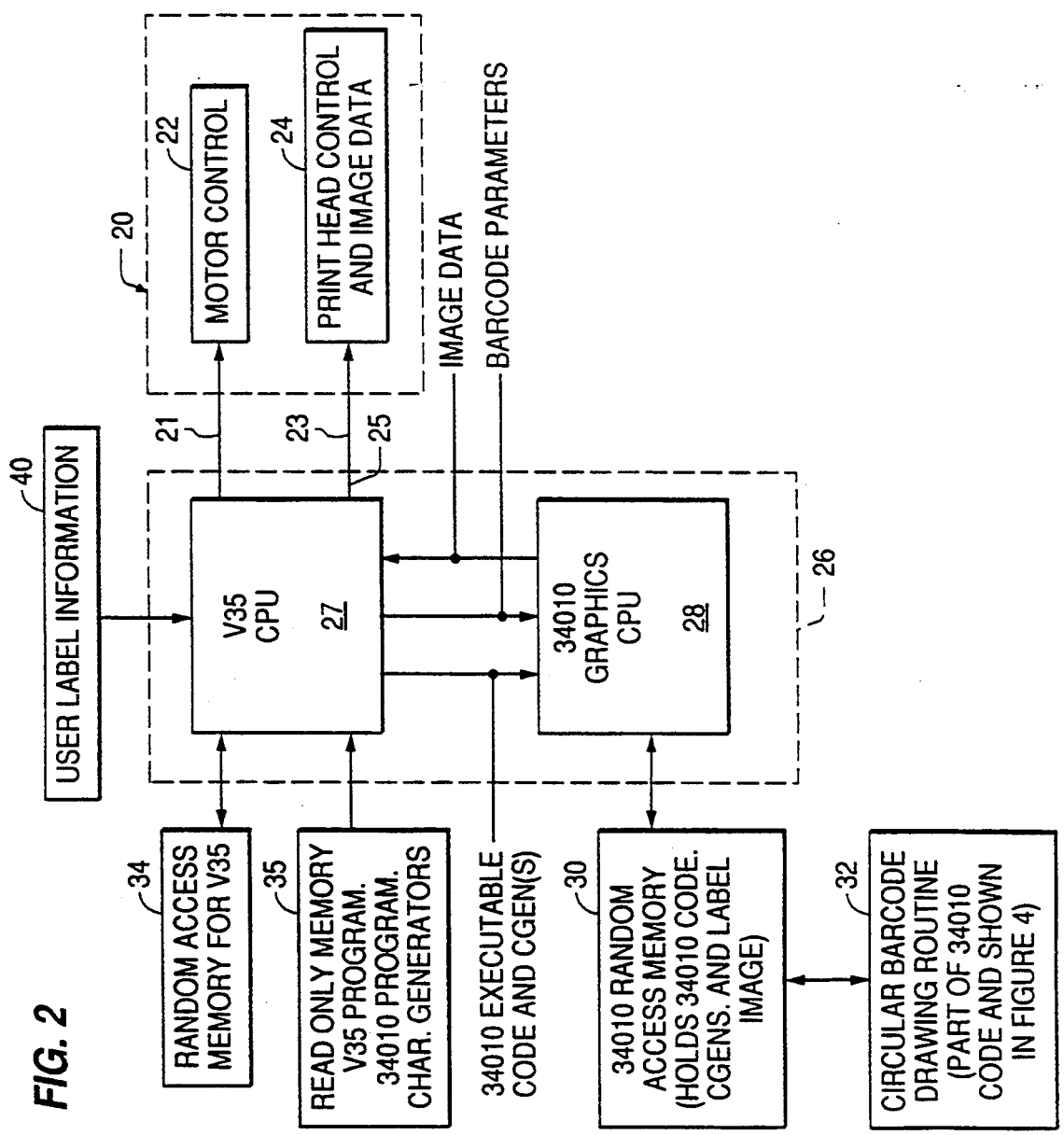
FIG. 2 is a block diagram of the firmware components of the circular barcode printing apparatus, according to the invention.

FIG. 2 illustrates in a block diagram format the firmware and programs used to generate the circular barcode 10 of FIG. 1 for printing by a printer, shown generally by a reference numeral 20. The printer 20 includes a motor control 22 responsive to a motor control input signal 21 and a print head control and image data generation portion 24 responsive to a print head control signal 23 and an image generation data control signal 25. The printer 20 is thus commanded by a central control unit 26 having a CPU 27, such as a V35 CPU, cooperating with a graphics CPU 28, such as a TI 34010 graphics CPU, for character generation. It is a main feature of this invention to provide a routine for generating a circular barcode, as shown in FIG. 4, which cooperates with the CPU 28 and the CPU 27 to generate an image generation data control signal 25 which causes the circular barcode to be printed.

The graphics CPU 28 is normally loaded in its RAM 30 with its operational code, including coding for character generation and label imaging, as is well known in the art. That RAM 30 is also loaded with a circular barcode routine, shown generally by the block 32 which cooperates with the drawing routine of the CPU 30, and will be discussed in greater detail in connection with the discussion of FIGS. 3 and 4. The CPU 27 includes a RAM 34 and a ROM 35 for executing its program and for character generation. User label information shown generally at the block 40 is input to the CPU 27 for defining the barcode which will be generated. Such inputs for relating to barcode generation are well known.

Thus, in operation, the CPU 27 provides execution and character generation commands to the graphics CPU 28 which cooperates with its RAM 30 further loaded with the circular barcode routine 32. The CPU 28 is also responsive to the barcode parameters input through the CPU 27 from the user label information at block 40. In turn, the graphics CPU 28 generates image data to the CPU 27 to generate the motor control signal 21, the print head control signal 25, and the image data generation control signal 23. The use of such systems, their interfacing, and their interfacing with a thermal printer are within the skill of the art so that detailed information is not needed.

Figure 3:
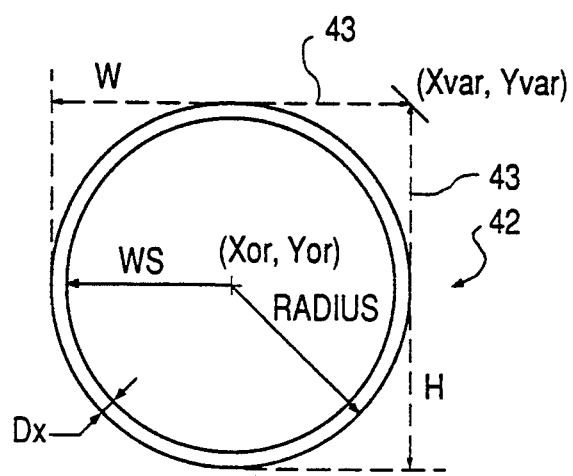
FIG. 3 is a diagrammatic illustration of the parameters used in framing a circular barcode as a step in the routine of FIG. 4.
Figure 4:
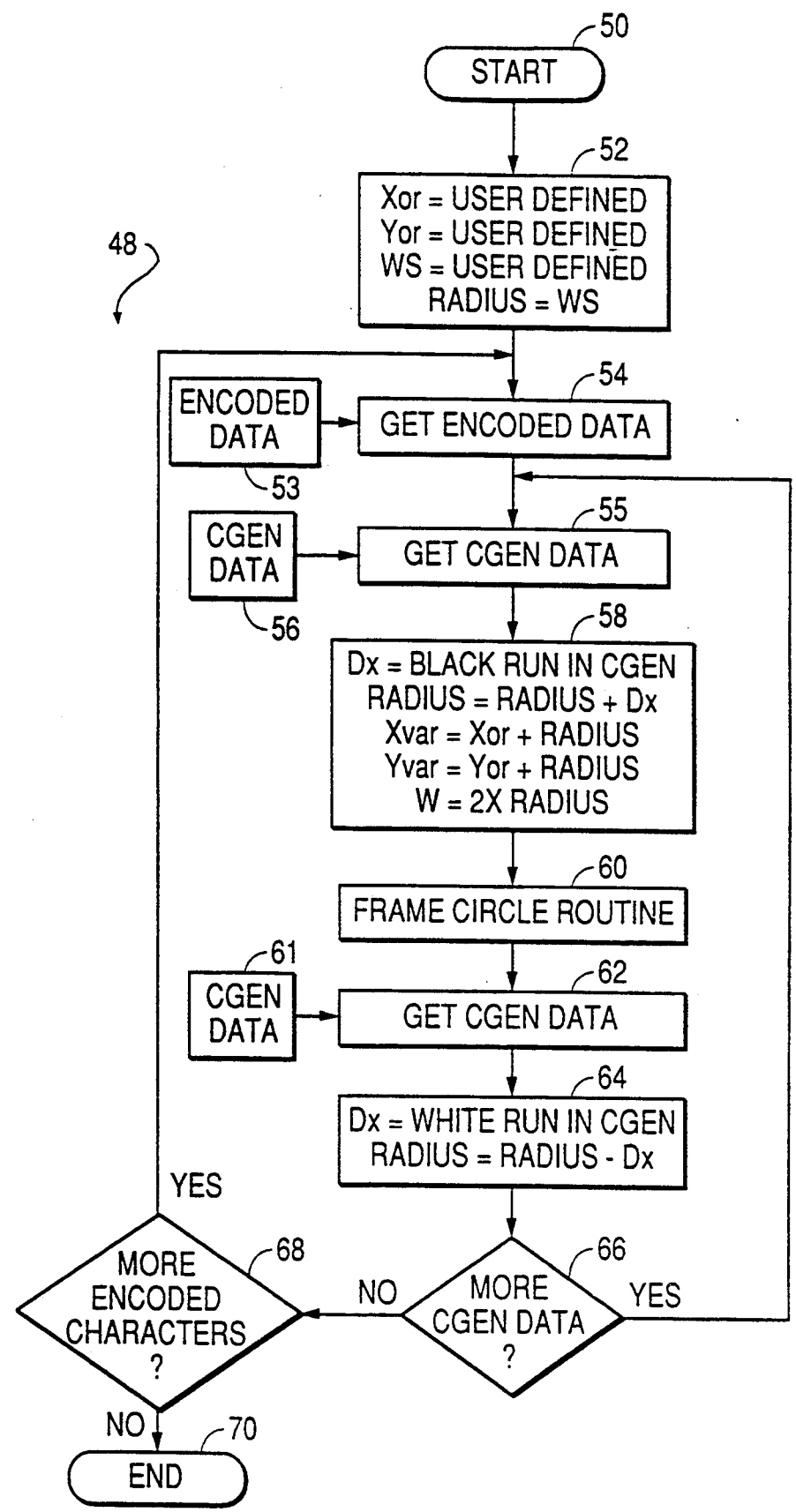
FIG. 4 is a block diagram of the routine for generating a circular barcode.

FIG. 3 shows an anatomy of a framed circle for use in understanding the circular barcode routine of FIG. 4. Specifically, it is desired to frame the circular barcode 42 within a frame 43 shown in dotted lines having a width W and a height H. The circular barcode can be framed at the limits of the frame 43 as shown, or with programmable margins. When thus framed, the circular barcode has an origin defined by the coordinates Xor, Yor and a radius R, which is the current radius of the framed circle. Thus, Xor and Yor are user defined coordinates defining the center of the circle. The white space WS is a barcode quiet zone as defined by the user, in the center of the barcode, in units of thermal printhead dots, and is defined by the radius R of the inner circle separated by a black ring bar thickness Dx from the outer radius R of the framed circle. Xvar, Yvar are adjusted x,y coordinates defining respectively the right side and top of the circle. W is the width/height of the framed circle in an x,y coordinate system. With these parameters in mind, the routine of FIG. 4 can now be described.

An initialization and start step 50 initiates operation of the circular barcode routine 48 which is loaded in the RAM 30 shown in FIG. 2. Upon receipt of the user label information 40 (FIG. 2), the routine defines the origin of the circular barcode Xor, Yor, and thus defines the white space WS, and the radius of the white space R−Dx, in a step 52. Once the origin and the white space of the framed barcode circle are established, the routine proceeds to a step 54 which retrieves encoded barcode data 53 from the RAM 30. Once the fetch step 54 is completed, the routine proceeds to a step 56 which retrieves character generator data (CGEN) from the RAM 30. The character generator data defines the bars and spaces of that selected particular barcode, such as is seen for the barcode of FIG. 1. In this particular routine, these data take the form of logical 1's for black and logical 0's for white. The runs of bits are referenced by a pointer defined by the encoded data format, and the routine is ready to generate a framed circle.

To generate the framed circle, the routine proceeds to the step 58 which is a black run of the character generator data to define the radius R+Dx, an Xvar=Xor+R, a Yvar=Yor+R, and a width W of the circle equal to 2R. The routine then proceeds from the black run step 58 to a framed circle routine, shown in step 60, stored in the RAM 32. Development and storage of an operable framed circular algorithm to generate a framed circle is within the skill of the programming art.

Then, the routine proceeds to retrieve character generator data 61 in a step 62, followed by a white run where the radius is R+Dx, in a step 64. Thus, at this point, an innermost circle of a multi-circle barcode has been generated. Additional circles are then generated following the interrogation in step 66. If the answer is yes, the routine repeats steps 56, 60, 62, and 64 for the next outermost data circle. If the answer is no, the routine proceeds to an interrogation in step 68 of whether more encoded characters are desired. If the answer is yes, the routine returns to step 54 to retrieve the next desired encoded data, and if not, the routine proceeds to an end 70.

Thus, a microprocessor controlled printer, such as a thermal printer for printing a circular barcode has been described.

Although the present invention has been described in connection with a preferred embodiment thereof, many other variations and modification will now become apparent to those skilled in the art. It is preferred, therefore, that the present invention be limited not by the specific disclosure herein, but only by the appended claims.

What is claimed is:

1. A method of printing a circular bar code pattern with a printer, comprising the steps of:
    retrieving stored data representative of a userselected barcode;
    retrieving stored character generator data defining a plurality of bars and spaces representative of said user-selected barcode;
    transforming said retrieved barcode into a substantially planar, circular barcode having an origin, a radius, and a white space for said circular barcode; and
    causing a printer to print said circular barcode.

2. A method of printing a circular bar code pattern with a printer, comprising the steps of:
    retrieving stored data representative of a userselected barcode;
    retrieving stored character generator data defining a plurality of bars and spaces representative of said user-selected barcode;
    transforming said retrieved barcode into a circular barcode; and
    causing a printer to print said circular barcode, wherein said user-selected barcode defines an origin, a radius, and a white space for said circular barcode.

3. A method as set forth in claim 2, wherein a step of retrieving stored character generator data is followed by a step of generating a black run in the character generator data to define Xvar, Yvar data for a circular barcode of width W, followed by a step of generating a white run in the character generator data for a radius R=R+Dx, where Dx is the width of the black circle generated in the black run step.

4. A method as set forth in claim 3, further repeating said black run and said white run steps until a circular barcode representative of said user-selected barcode is generated.

5. A circular bar code printing apparatus includes a bar code storage means for storing a variety of linear bar code patterns, means for selecting at least one of said stored linear bar code patterns; character generator means for generating a character defining a plurality of bars and spaces for the selected barcode; means for referencing said character by a pointer defined by the encoded data format; means for framing a circle defining said selected barcode; means for generating said circular barcode; and means for printing said circular barcode.

6. A circular barcode printing apparatus as set forth in claim 5 wherein said bar code storage means stores either or both read barcodes or barcode algorithms representing said plurality of said stored linear bar code patterns.

7. A circular barcode printing apparatus as set forth in claim 5 wherein the means for framing a circle includes means for determining a white space as a barcode quiet zone in the center of the barcode in units of thermal printhead dots Xor, Yor for a radius R, where Xor is a user supplied X coordinate at the center of the circle, and Yor is a user supplied Y coordinate at the center of the circle; Xvar for an adjusted X coordinate which defines the right side of the circle; Yvar for an adjusted Y coordinate which defines the top of the circle; Dx for a horizontal and vertical separation between the outer and inner ellipses of the framed circle, and W for the width and/or height of the framed circle.

8. A circular barcode printing apparatus as set forth in claim 7 wherein the means for generating the circular bar code includes means for retrieving said encoded barcode data; obtaining character generator data by a black run, followed by a frame circle routine, and a white run, and repeating the routine.

* * * * *